UNITED STATES PATENT OFFICE.

J. J. MAPES, OF NEWARK, NEW JERSEY.

IMPROVEMENT IN FERTILIZERS.

Specification forming part of Letters Patent No. 26,196, dated November 22, 1859.

*To all whom it may concern:*

Be it known that I, J. J. MAPES, of Newark, New Jersey, have invented an Improved Fertilizer called the "Improved Superphosphate of Lime," of which the following is a full, clear, and exact description.

By the analysis of soils and plants it is well known what are their constituents, and it is also well known that the continued cropping of soils with less amounts of amendments than those removed as constituents of the crops must gradually impoverish the soil, and in consequence we find the uneven or unequal removal of these constituents to render the soil unfit for the raising of wheat and other crops requiring the presence of phosphoric acid, lime, potash, &c., they being among the first of the natural constituents of the soil parted with, and hence the continued reduction of the wheat and other crops per acre in the older States has occurred.

The constituents of the fertilizer invented by me are such as more nearly to supply these deficiencies than any other before known, and under my combination they are in a less volatile state, so as to admit of a more economic use. The supply of ammonia, so necessary as a stimulant to cause plants to appropriate their inorganic wants when within their reach, in a soluble and non-volatile form, and properly combined with the inorganic necessities of the soil and plants, is new and original.

The nature of my invention consists in saturating phosphate of lime—such as mineral apatite or calcined bones—with sulphuric acid to such extent as to form the superphosphate of lime by combining part of the lime with the sulphuric acid as sulphate of lime, leaving the whole of the phosphoric acid combined with the remaining portion of lime as superphosphate of lime, when such products are combined with guano and sulphate of ammonia, or the equivalents thereof, such as the ammoniacal liquor of gas-works or other ammoniacal waste.

I take one hundred parts, by weight, of apatite or calcined bones or phosphate of lime, in a suitable vessel and saturate it with sulphuric acid, which will require about fifty-six parts, by weight, of the ordinary sulphuric acid of commerce, and after the superphosphate of lime is formed by part of the lime combining with the sulphuric acid as sulphate of lime, and the phosphoric acid combining with the remaining portion of lime as superphosphate of lime, I then add and thoroughly mix therewith thirty-six parts, by weight, of Peruvian guano and twenty parts, by weight, of sulphate of ammonia; or the ammonia may be added by equivalent additions of the ammoniacal liquor of gas-works or other ammoniacal waste.

It is found that the amount of sulphuric acid here prescribed for converting the bone earth into superphosphate affords sufficient excess of acid to convert the carbonate and other unstable salts of ammonia into the sulphate of ammonia, and thus fix these volatile ingredients of the Peruvian guanos and secure their fertilizing qualities to the soil and crops.

This compound thus produced constitutes a fertilizer more nearly corresponding with the general deficiencies of soils than any other heretofore known, and therefore better adapted to furnish the ingredients required, while at the same time the volatile carbonates of the guano are changed into the non-volatile sulphates, and thus detained in the soil until used by the plants, instead of being dissipated into the atmosphere, as when used in the ordinary methods heretofore practiced.

I do not design to limit myself to the exact proportions of the ingredients herein named, as the chemical constituents may vary in their composition. The crude products may be more or less pure and require more or less of the other ingredients to neutralize them.

Having described the nature of the invention and shown the several peculiarities of the process for fixing the ammonia and making a concentrated manure, I design to cover these materials or their equivalents.

I do not claim the use of sulphuric acid for preparing the superphosphate of lime, nor yet the use of sulphate of ammonia as a manure, nor the mixture of one guano with another, as such use and such mixtures are known; but

What I claim as my invention, and desire to secure by Letters Patent, is—

The production of a fertilizer by combining guano and sulphate of ammonia or its equivalent with burned bones, or their equivalent when the said bones or equivalent have been treated by sulphuric acid, as specified, the whole being prepared substantially in the manner and for the purpose set forth.

JAS. J. MAPES.

Witnesses:
WALTER B. NORTH,
SAML. GRUBB.